Aug. 11, 1959 J. E. COLLINS 2,898,936
PILOT ACTUATED FLUID CONTROL VALVE
Filed April 17, 1957 2 Sheets-Sheet 1

INVENTOR.
JOHN E. COLLINS
BY
Bates, Teare & McBean
ATTORNEYS

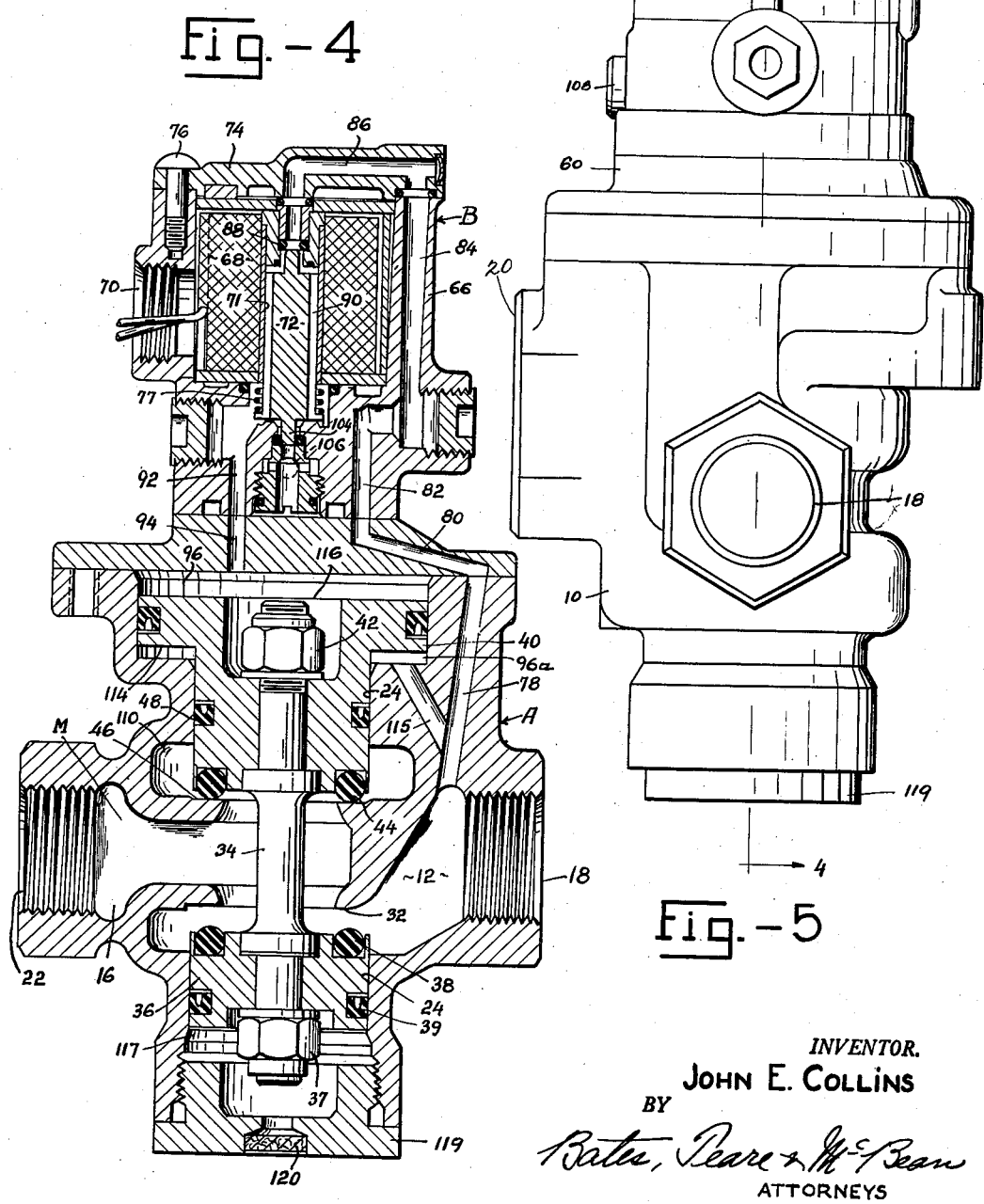

United States Patent Office 2,898,936
Patented Aug. 11, 1959

2,898,936
PILOT ACTUATED FLUID CONTROL VALVE

John E. Collins, Akron, Ohio, assignor, by mesne assignments, to International Basic Economy Corporation, New York, N.Y., a corporation of New York Application April 17, 1957, Serial No. 653,448

8 Claims. (Cl. 137—620)

This invention relates to valves and more particularly to poppet type valves which are used for controlling the flow of fluids in gaseous or liquid systems.

One of the difficulties experienced in valves of the above type is the fact that the stem or plunger may be left in an undesirable position in the event of an electric current failure to the solenoid pilot control valve. More specifically, failure of the pilot control valve may cause the plunger to be left in a position whereby the fluid is allowed to exhaust inadvertently or in a position whereby the fluid from the intake port is allowed to flow inadvertently into the piston-cylinder mechanism.

It is an object of the present invention to provide a valve having a plunger controlled by a solenoid operated pilot control member, whereby the plunger returns rapidly to a predetermined position when the supply of electric current to the solenoid member is cut off.

A further object of the present invention is to provide a plunger valve, wherein the plunger is reciprocated quietly and smoothly.

A further object of the present invention is to provide a solenoid operated plunger control valve wherein reciprocation of the plunger is exclusively controlled by a fluid medium.

Briefly, the foregoing objects are accomplished by providing a poppet valvet having a plunger reciprocated by pressurized fluid which is controlled by a solenoid operated pilot control member. The plunger is reciprocated by pressurized fluid acting on one or both ends of the plunger, or on one or both ends of a piston head on the plunger, reciprocation being effected by a difference in the cross-sectional areas of the two ends of the plunger or of the piston head. The plunger may have poppet valve seat portions thereon which open and close poppet seats in the valve housing, thus controlling the flow of pressurized fluid through the housing in a predetermined manner. Control of the flow of fluid through the valve is effected by reciprocating or displacing the plunger to predetermined positions within the valve housing with respect to the inlet, outlet and exhaust ports therein, which may be in communication with a piston-cylinder mechanism or the like. The valve is constructed so that the plunger may be locked at each end of its stroke by fluid pressure directly from the fluid supply line. In the event of a current failure to the solenoid operated pilot control member, the plunger will return to a predetermined position, since inlet pressurized fluid is always maintained on the smaller end of the plunger or on the smaller end of the plunger head. This construction assures a soft, quiet action in the reciprocation of the plunger, and additionally insures the plunger returning to a predetermined position in the valve housing upon failure of the electric current to the solenoid pilot control member.

Other objects and advantages of the invention will be apparent from the following description taken in conjunction with the drawings in which:

Fig. 4 is a vertical sectional view of the solenoid operated plunger valve showing a modification of the invention; and Fig. 5 is a side elevational view of the valve shown in Fig. 4.

Figure 2:
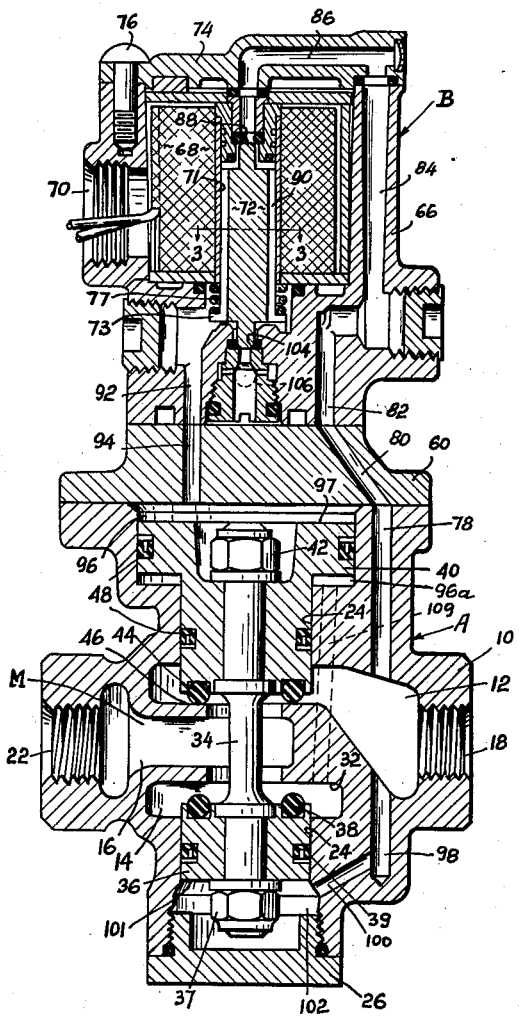
Fig. 2 is a vertical sectional view taken along the line 2—2 of Fig. 1.

The valve illustrated is one which is adapted for use in controlling the flow of fluid under pressure from a source of supply to one or more outlet conduits under the control of a fluid pressure actuator, the latter of which may be controlled by an operator. The valve illustrated is an in-line poppet-type three-way fluid valve but which is adapted for two-way operation.

Referring to the drawings, there is shown a plunger valve A having a body or housing 10, including a fluid manifold M comprising, an inlet passageway 12 (Fig. 2) and outlet passageways 14 and 16, having at their outer ends the inlet port 18, the exhaust port 20 (Fig. 1) and the outlet port 22 (Fig. 2) respectively. The manifold includes a bore 24, which extends longitudinally through the housing 10 and is in communication with the passageways 12, 14 and 16. The lower end of the bore 24 may be closed by the screw cap 26.

The flow of fluid through the valve is controlled by a piston assembly or plunger 34, which is slidably positioned within the bore 24. Disposed at the lower end of the plunger 34 is a piston head 36, which may be secured on the plunger by the nut 37. The head 36 has an O-ring 38 on the upper end thereof, which is adapted to engage the oppositely disposed seat 32 on the housing 10 when the plunger is in its upper position within the bore 24. The head 36 also contains the seal ring 39 on the side thereof to prevent the flow of fluid between the head 36 and the housing 10. Disposed at the upper end of the plunger 34 is a piston head 40, which may be secured to the upper end of the plunger by the nut 42. The head 40 has an O-ring 44 disposed on the lower end thereof, which is adapted to engage the oppositely disposed seat 46 in the housing 10 when the plunger is in its lower position within the bore 24 as shown in Fig. 2. The piston head 40 also contains the seal rings 48 on the sides thereof for preventing the flow of fluid between the head 40 and the housing 10 thereat.

Figure 1:
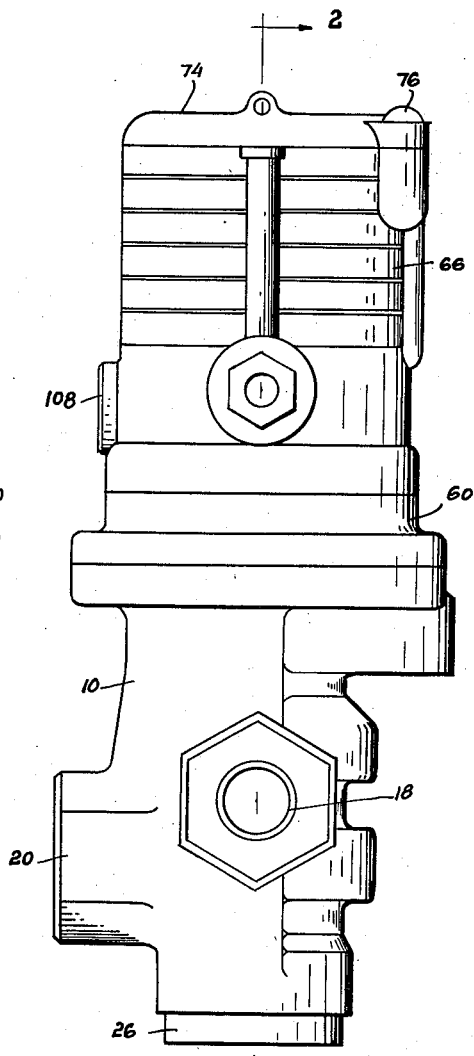
Fig. 1 is a side elevational view of a solenoid operated plunger control valve constructed in accordance with the invention.

When the plunger 34 is in its lower position within the bore 24 as shown in Fig. 2, the O-ring 44 is in engagement with the seat 46, at which time fluid may exhaust from the port 22 through the passageway 16, past the open valve seat 32, through the passageway 14, and out the exhaust port 20 (Fig. 1). At the same time, the flow of inlet fluid from the inlet port 18 (Fig. 2) through the inlet passageway 12 is blocked off by reason of the engagement of the O-ring 44 with the seat 46.

When the plunger 34 is in its upper position within the bore 24, the O-ring 38 on the lower head 36 is in engagement with the seat 32, thereby preventing the flow of fluid between the ports 22 and 20. However, with the plunger in the latter position, fluid may flow from the inlet port 18, through the inlet passageway 12, past the (open) valve seat 46, through the outlet passageway 16 and out the outlet port 22 to a piston-cylinder mechanism or the like.

Disposed at the top of the housing 10 is a solenoid operated pilot control member or valve B, which may be used to control reciprocation of the plunger 34. A plate 60 may be interposed between the main valve housing 10 and the solenoid valve B to form a connector or adapter plate therebetween. The solenoid valve B comprises a body or housing 66 containing a solenoid coil 68, which is in accessible communication with the junction box portion 70 of the body 66. Within the solenoid coil 68, an armature 72 is vertically reciprocable in the bore of a tube 71, and is responsive to energization of the solenoid coil 68 by any suitable timer device. A spring 77 may be provided between the lower flange 73 on the armature and the lower end of the solenoid coil 68 to retain the armature in its lower position within the bore of the tube 71 when the solenoid coil is de-energized and in the position of the armature 72 in Fig. 2, its lower head 104 closes an end port 106 communicating with exhaust. Also in this position the upper head 88 of the armature is displaced to open the upper end port communicating with pressure supply passageway 86 so that the upper end port communicates pressure from passageway 86 and through the bore of tube 71 to an intermediate port 92 opening into the side of tube 71. A plate 74 is retained on the top of the housing 66 by the screws 76.

Figure 3:
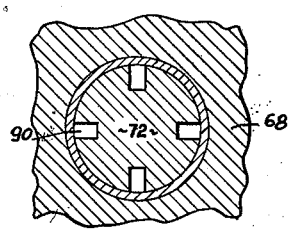
Fig. 3 is an enlarged sectional view taken along the line 3—3 of Fig. 2.

Operation of the solenoid pilot control valve B will now be described. It is assumed that the solenoid valve B (Fig. 2) is de-energized. Since the inlet port 18 is connected to a source of pressurized fluid, the inlet passageway 12 always has pressurized fluid therein. Accordingly, from the inlet passageway 12, fluid may flow up the passageway 78 in the housing 10, up the passageway 80 in the plate 60, up the passageways 82 and 84 in the solenoid housing 66, across the passageway 86, past the open valve head 88 on the upper end of the armature 72, through the slots 90 in the side of the armature (Figs. 2 and 3), down the passageway 92 in the housing 66 (Fig. 2), and then down the passageway 94 in the plate 60 and into the chamber 96 formed between the main valve housing 10 and the plate 60, and in which the upper piston head 40 is disposed. The pressurized fluid in the chamber 96 acts on the piston head 40 thus forcing the plunger 34 to its lower position in the housing 10. Pressurized fluid also flows from the inlet port 18, through the inlet passageway 12, down the passageway 98, through the passageway 100, and into the chamber 102 where the fluid acts on the lower end 101 of the lower piston head 36. Thus, pressurized fluid is always maintained on the lower piston head 36, since the chamber 102 is in direct communication with the inlet port 18 through the passageways 98 and 100. However, the plunger 34 will always seek its lower position in the housing 10 when fluid is in the chamber 96, since the upper end 97 of the upper piston head 40 has a greater cross sectional area than the lower end 101 of the lower piston head 36. Thus, reciprocation of the plunger 34 is responsive to the admittance and discharge of pressurized fluid to and from the chamber 96, which is controlled by the energization and de-energization of the solenoid coil 68.

The main plunger 34 may be moved to its upper position in the housing 10 by exhausting the pressurized fluid in the chamber 96. This may be accomplished by energizing the solenoid coil 68, which in turn raises the armature 72 to its upper position in the solenoid housing, thereby closing the upper valve head 88 and opening the lower valve head 104. Pressurized fluid may now flow out of the chamber 96, up the passageways 94 and 92, past the open valve head 104, out the exhaust passageway 106, and out the exhaust port 108 (Fig. 1).

Operation of the plunger 34 is thus effected entirely by pressurized fluid acting on the piston heads disposed at opposite ends of the plunger 34. In the event of a failure of electric current to the solenoid pilot control valve B, the armature 72 would return to its lower position in the solenoid housing 66, by reason of the spring 77, thereby permitting pressurized fluid to enter the chamber 96 and thereby position the plunger 34 in its lower position in its housing 10, as aforedescribed. Thus, in the event of a failure of electric current to the solenoid pilot control valve, the plunger 34 will always return to its lower position in the housing 10, thereby permitting the pressurized fluid in the piston-cylinder mechanism or the like (which may be connected to the outlet port 22) to exhaust back through the outlet port 22 and out the main exhaust port 20, as aforedescribed.

The lower portion 96a of the chamber 96, below the lower end of the upper piston head 40, may be vented to the atmosphere by any suitable means as, for example, the passageway 109 leading therefrom to the outlet passageway 14, which is in communication with the exhaust port 20, thereby preventing any possible build-up of pressure in the chamber lower portion 96a, which may interfere with reciprocation of the plunger 34.

Figs. 4 and 5 show a modification of the valve shown in Figs. 1 and 2, wherein like parts have been identified by like numbers. Referring to Fig. 4, when the plunger 34 is in its lower position as shown, pressurized fluid may enter the inlet port 18 and flow through the inlet passageway 12, through the open valve seat 32, through the outlet passageway 16, and out the outlet port 22 to a piston-cylinder mechanism or the like. At the same time, the valve seat 46 is closed, thereby preventing the flow of fluid through the exhaust passageway 110 and out the exhaust port 20 (Fig. 5).

When the plunger 34 is in its upper position in the bore 24, pressurized fluid may flow back through the port 22 (Fig. 4), through the passageway 16, past the now-opened valve seat 46, out the exhaust passageway 110, and out the exhaust port 20 (Fig. 5). At the same time, the valve seat 32 (Fig. 4) is closed, thereby preventing the flow of fluid in either direction thereby.

Reciprocation of the plunger in the Fig. 4 modification is effected by the same principle as described with reference to Fig. 2, namely by a difference in cross sectional area of those areas on the plunger 34 which are exposed to fluid pressure. However, in the Fig. 4 modification, the lower surface 114 of the upper piston head 40 is always exposed to fluid pressure, said lower surface being of a smaller cross sectional area than the upper surface 116 of the piston head 40 which is exposed to fluid pressure.

In operation, pressurized fluid is admitted by the solenoid control valve B into the chamber 96 as described in connection with Figure 2, thereby applying the pressurized fluid to the top of the piston head 40, and thereby forcing the plunger to its lower position as shown in Fig. 4. The plunger may be raised to its upper position by exhausting the pressurized fluid from the chamber 96 as described in connection with Fig. 2. In the latter case, the plunger 34 will rise to its upper position by reason of the pressurized fluid acting on the lower piston surface 114, said fluid having entered the lower portion 96a of the chamber 96, through the inlet port 18, up the lower portion of the passageway 78, through the passageway 115, and into the chamber portion 96a.

To prevent a build-up of pressure in the chamber 117, which may be caused by fluid leaking down past the seal ring 39, the cap 119 may contain a filter 120, thereby permitting any pressurized fluid which may enter the chamber 117 to exhaust to the atmosphere.

In the valve shown in Figs. 1 and 2 and in the modification shown in Figs. 4 and 5, the plunger is reciprocated entirely by fluid means. Such construction assures fast, positive, quiet action in the reciprocation of the plunger. Additionally, in the Figs. 1 and 2 structure, when there is a current failure to the solenoid pilot control valve, the plunger is left in a position whereby pressurized fluid may be exhausted from a piston cylinder mechanism or the like which may be connected to the port 22. In the Figs. 4 and 5 modification, a current failure to the solenoid pilot control valve results in the plunger 34 being positioned so that the piston-cylinder mechanism connected to the port 22 is supplied with pressurized fluid from the inlet port 18. With these constructions, the piston cylinder mechanism or the like may be open to inlet air or to exhaust as desired when the electric current fails, depending upon the characteristics of the mechanism the valve A controls.

The terms and expressions which have been employed are used as terms of description, and not of limitation, and there is no intention in the use of such terms and expressions, of excluding any equivalents of the features shown or described or portions thereof, but it is recognized that various modifications are possible within the scope of the invention claimed.

I claim:

1. Valve mechanism comprising a housing having a bore with axially spaced poppet seats therein and having spaced passageways extending from the exterior of the housing to the bore, a plunger disposed in said bore for reciprocation and having poppet heads for selectively engaging said poppet seats and thereby directing fluid flow between said passageways as said plunger is reciprocated, said plunger further having opposed differential area effective pressure-responsive actuating surfaces thereon, means for communicating equal fluid pressure to said opposed surfaces simultaneously to bias said plunger in the direction of the fluid pressure force acting on the larger of said opposed surfaces to a predetermined position in said bore, means for selectively exhausting said fluid pressure from the larger actuating surface area of said plunger so that the plunger is thereupon displaced in said bore by the force of said pressure fluid against the opposing smaller area actuating surface, and means for automatically re-communicating said larger area actuating surface with said fluid pressure in the event of operational failure of said exhausting means to automatically restore said plunger to said predetermined position in said bore.

2. Valve mechanism comprising a valve housing having axially spaced poppet seats therein and fluid flow passageways therethrough, a plunger having poppet heads thereon disposed in said housing for reciprocation to selectively engage said seats and direct flow between said passageways, said plunger having opposed differential area effective pressure-responsive actuating surfaces thereon, a port in said housing for communicating the smaller of said actuating surfaces continuously with a source of fluid pressure, an electro-magnetic actuated control valve having a de-energized position in which said source of fluid pressure communicated with said smaller actuating surface is simultaneously communicated in equal intensity to the larger of said surfaces to bias said plunger in the direction of the fluid pressure force acting on said larger surface, said electro-magnetic valve having an energized position for exhausting said fluid pressure from communication with the larger of said opposed surfaces so that the plunger is thereupon displaced in said bore by the force of said pressure fluid against the smaller surface thereof, and means for automatically restoring said electro-magnetic actuated valve to said position to re-communicate said larger surface with said fluid pressure in the event of energizing power failure of said electro-magnetic actuated valve to automatically restore said plunger to said predetermined position in said bore.

3. Valve mechanism according to claim 2 wherein said source of fluid pressure communicated to said opposing differential area effective actuating surfaces of the plunger is the fluid medium communicated to said housing and the flow of which is regulated by the axial position of said plunger.

4. Valve mechanism according to claim 2 wherein said housing includes an inlet passageway for receiving a fluid pressure medium, an outlet passageway for communicating with a fluid actuated motor, and an exhaust passageway, and wherein said plunger is biased by said differential area surfaces automatically to a position in which said outlet and exhaust passageways are inter-communicated and said inlet passageway is closed to both the other passageways.

5. Valve mechanism according to claim 2 wherein said housing includes an inlet passageway for receiving a fluid pressure medium, an outlet passageway for communicating with a fluid motor, and an exhaust passageway, and wherein said plunger is biased automatically to a position in which said inlet and outlet passageways are inter-communicated and said exhaust passageway is closed to both the other passageways.

6. Valve mechanism comprising a valve housing having axially spaced poppet seats therein and fluid flow passageways therethrough including an inlet passageway for communication with a fluid pressure medium to be flow controlled by the valve, a plunger having poppet seats thereon disposed in said housing for reciprocation to selectively engage said seats and direct flow of the medium between said passageways, said plunger having other means associated with said plunger for effecting reciprocation of the plunger, the latter said means comprising opposing effective actuating surfaces, means for communicating one such actuating surface with said inlet passageway so that the fluid medium received in said inlet also exerts a continuous pressure force on such actuating surface, an electro-magnetic pilot valve having a de-energized position for continuously communicating the opposite actuating surface with said inlet passageway, the mechanism being arranged so that the force communicated to the latter said surface is larger than the opposing pressure force continuously communicated to the opposite surface whereby the plunger is biased to a predetermined position in said housing, and said pilot valve having an energized position to exhaust the fluid pressure effecting said larger biasing force whereby the plunger is displaced in response to said exhausting action, and said pilot valve including means for automatically re-communicating said larger force to the plunger to restore said plunger to said predetermined position in the event of electrical power source failure for operating said valve.

7. Valve mechanism comprising a housing, fluid inlet and outlet and exhaust ports therein, a pair of axially spaced poppet valve seats in the housing through which said ports are mutually communicated, a plunger member disposed slidably in said housing for reciprocation between two positions relative to the housing, said plunger including a pair of axially spaced poppet valve heads in axial register with said seats, said valve heads being arranged so that one is engaged and one is disengaged from said valve seats in either of the respective positions of said plunger, and said plunger including two opposed differential area actuating surfaces remote from said valve heads, means for continuously communicating the smaller of said actuating surfaces with said inlet port so that the fluid medium controlled by said plunger exerts a continuous biasing force on said smaller area surface, a solenoid-actuated pilot valve having a fluid conducting tube therein with fluid ports at opposite ends thereof and an intermediate fluid port, an armature slidable in said tube and normally biased to a position to close one end port of said tube communicating with exhaust, the opposite end port and said intermediate port providing communication through said tube from said inlet port of said housing to said larger effective actuating surface of said plunger whereby the plunger is continuously biased by the resulting force on said larger surface to one of its respective positions in said housing in the de-energized position of said armature, said solenoid valve being energizable to block said communication of said inlet port with said larger surface and to exhaust pressure from against said larger surface whereby the plunger is displaced by the pressure force of fluid communicated to said smaller surface, and means for biasing said armature to said de-energized position in said tube to automatically effect restoration of said plunger to its corresponding de-energized position in the event of electrical power supply failure of said solenoid valve.

8. Valve mechanism comprising a housing, fluid inlet and outlet and exhaust ports therein, axially spaced first and second bore portions in said housing, inlet and outlet and exhaust chambers between said bore portions, a pair of axially spaced first and second annular poppet valve seats separating said chambers and through which said chambers are adapted for communication one with another, axially spaced cylindrical rigidly inter-connected first and second poppet valve heads slidably disposed in said first and second bore portions respectively and having opposing sealing faces engageable with their respective valve seats, said valve heads being arranged so that one is engaged and the other disengaged on their respective valve seats and said valve heads jointly forming a plunger so that the heads are simultaneously displaceable axially to reverse their order of engagement with the valve seats, a third bore portion in said housing remote from the aforesaid bore portions, a piston slidable in said third bore portion in sealing engagement, said piston being connected to said valve heads to form a part of said plunger and having a large area transverse actuating surface thereon, a smaller transverse actuating surface on a region of the plunger opposite said large area, means for continuously communicating said smaller actuating surface with said inlet port so that said smaller surface is continuously subjected to a biasing force of the inlet fluid pressure in service, means for communicating the larger actuating surface with said inlet port so that said larger surface is subjected to a larger biasing force by said inlet pressure fluid and said plunger is maintained in a position with its valve heads in a predetermined order of engagement and disengagement with the valve seats, means for selectively exhausting fluid communicating with said larger surface to effect plunger displacement by the smaller surface biasing force, and means for automatically re-introducing said inlet fluid pressure to said larger surface to re-position the valve heads in said predetermined order when said selective exhaust means is not functioning.

References Cited in the file of this patent
UNITED STATES PATENTS

| | | |
|---|---|---|
| 412,327 | Gibson | Oct. 8, 1889 |
| 425,202 | Blanchard | Apr. 8, 1890 |
| 2,496,553 | Littlefield | Feb. 7, 1950 |
| 2,646,820 | McLeod | July 28, 1953 |
| 2,711,757 | Gardner | June 28, 1955 |